Nov. 13, 1923.

G. G. GILPIN 1,474,193

UNCOUPLING DEVICE FOR CAR COUPLERS

Filed May 19, 1922    4 Sheets-Sheet 1

Inventor
Garth G. Gilpin
Attorney

Nov. 13, 1923.

G. G. GILPIN 1,474,193

UNCOUPLING DEVICE FOR CAR COUPLERS

Filed May 19, 1922    4 Sheets-Sheet 2

Inventor
Garth G. Gilpin
Victor ~~~~~
Attorney

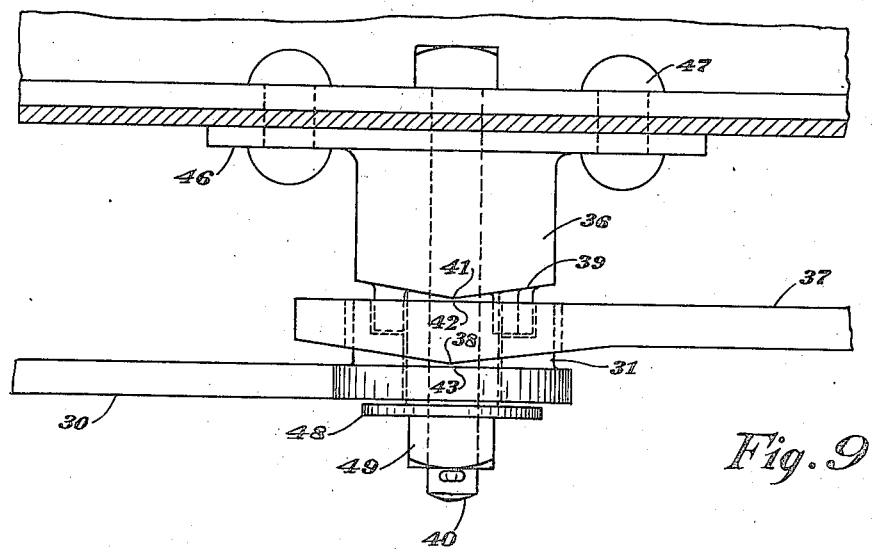
Fig. 9
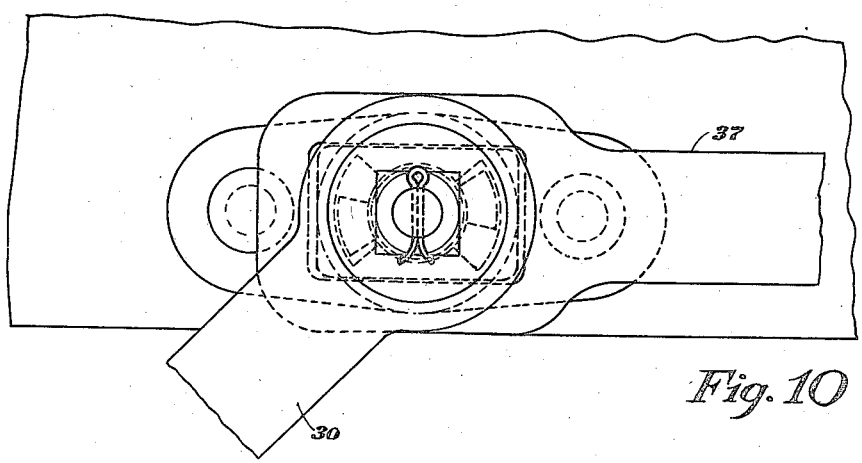
Fig. 10
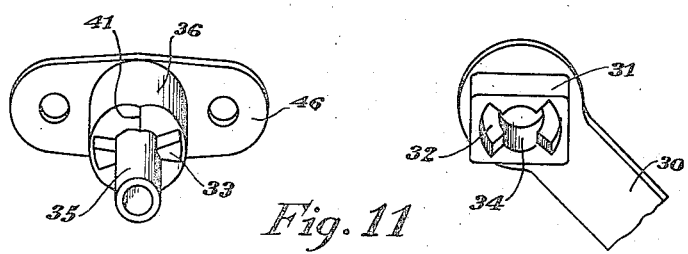
Fig. 11
Fig. 12
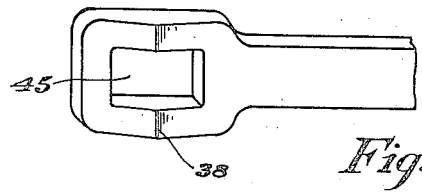
Fig. 13

Nov. 13, 1923. 1,474,193
G. G. GILPIN
UNCOUPLING DEVICE FOR CAR COUPLERS
Filed May 19, 1922 4 Sheets-Sheet 4

Inventor
Garth G. Gilpin
Attorney

Patented Nov. 13, 1923.

1,474,193

UNITED STATES PATENT OFFICE.

GARTH G. GILPIN, OF RIVERSIDE, ILLINOIS, ASSIGNOR TO UNION METAL PRODUCTS COMPANY, OF CHICAGO, ILLINOIS, A CORPORATION OF DELAWARE.

UNCOUPLING DEVICE FOR CAR COUPLERS.

Application filed May 19, 1922. Serial No. 562,099.

*To all whom it may concern:*

Be it known that I, GARTH G. GILPIN, a citizen of the United States, residing at Riverside, in the county of Cook and State of Illinois, have invented new and useful Improvements in Uncoupling Devices for Car Couplers, of which the following is a specification.

This invention relates to improvements in uncoupling devices for car couplers and more particularly to devices of this character employed on freight cars.

It is the object of this invention to provide a simple and efficient release rigging comprising but few parts and which can be readily attached to the different types of freight cars and is so simple in construction that it cannot be incorrectly applied even by an unskilled laborer.

The construction relates to what is known as the "push down" type of uncoupling device, which comprises a pin lifting lever connected to the coupler lock block and an operating lever so positioned on the car that a downward movement thereof raises the pin lifting lever and unlocks the coupler. In levers of this general type, mounted on a common fulcrum, the connection between the levers must allow for the longitudinal movement of the coupler in draft and in buffing. The pin lifting lever must have a limited upward movement so that if anything breaks within the coupler head the pin lifting lever cannot fly around and injure the trainman and it must be limited in its downward movement so that if the carry iron breaks it will prevent the coupler from falling on the track and wrecking the train. The outer end of the operating lever must be limited in its vertical movement so that if anything breaks within the coupler or the connection of the pin lifting lever to the coupler the trainman will not fall between the cars.

Another object of this invention is to obtain a device of this class in which the longitudinal movement of the pin lifting lever caused by the outward movement of the coupler is not transmitted to the operating lever so that the trainman standing on the operating lever is not shaken off.

Another object of this invention is to obtain a device of this class which has sufficient bearing area on the fulcrum to practically eliminate wear and friction of the parts, and furthermore, is so designed as to eliminate wear and friction between the pin lifting lever and operating lever.

While the preferred form of this invention is illustrated upon the accompanying sheets of drawings, yet it is to be understood that minor detail changes may be made without departing from the scope thereof.

Figs. 9 to 13 inclusive show a modified form wherein—

Fig. 9 shows an enlarged plan view.

Fig. 10 shows an enlarged elevation.

Fig. 11 shows the fulcrum casting.

Fig. 12 shows the fulcrum end of the operating lever.

Fig. 13 shows the fulcrum end of the pin lifting lever.

Figs. 14 to 19 inclusive show a modified form wherein—

Figure 14:
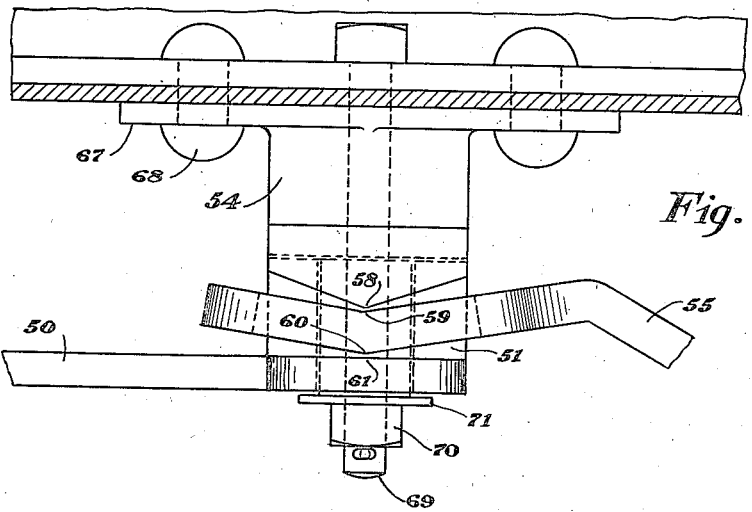

Fig. 14 shows an enlarged plan.

Figure 15:
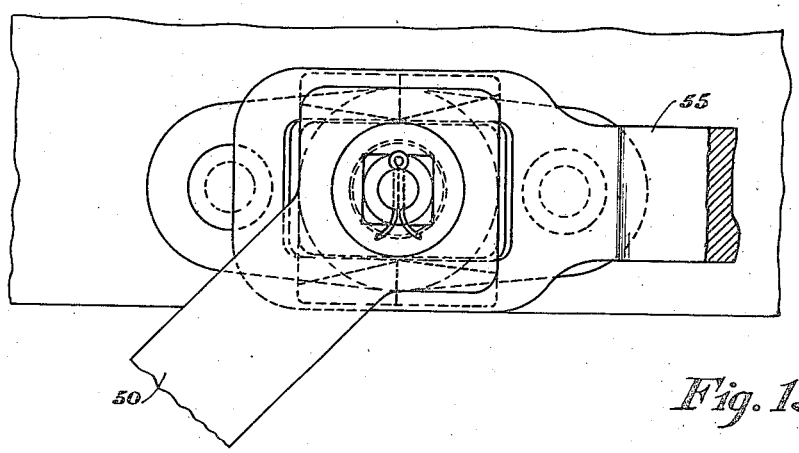

Fig. 15 shows an enlarged elevation.

Figure 16:
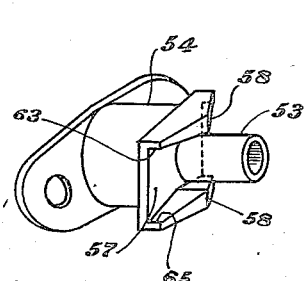

Fig. 16 shows the fulcrum casting.

Figure 17:
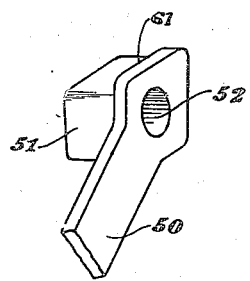

Fig. 17 shows the fulcrum end of the operating lever.

Figure 18:
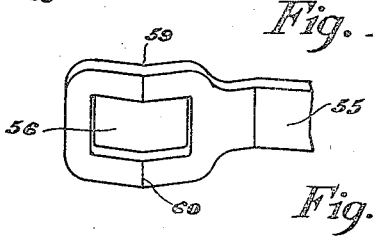

Fig. 18 shows the fulcrum end of the pin lifting lever.

Figure 19:
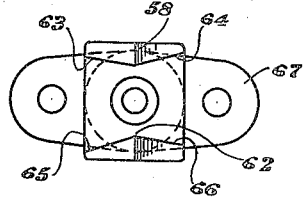

Fig. 19 shows an elevation of the fulcrum.

In the drawings 1 is the end of the car, 2 is the coupler, 3 is the striking casting, 4 is the operating lever, 5 is the pin lifting lever, 6 is the fulcrum casting mounted on the car in any convenient manner or place, and 7 is the coupler lock block eye. The end of the pin lifting lever is reduced in size, as shown at 8, so that it can pass through the coupler lock block eye. The operating lever is bent downwardly, shown at 9, and rebent to a horizontal position, as shown at 10, merely to comply with condition of the particular car shown.

Figures 5, 6, 7:
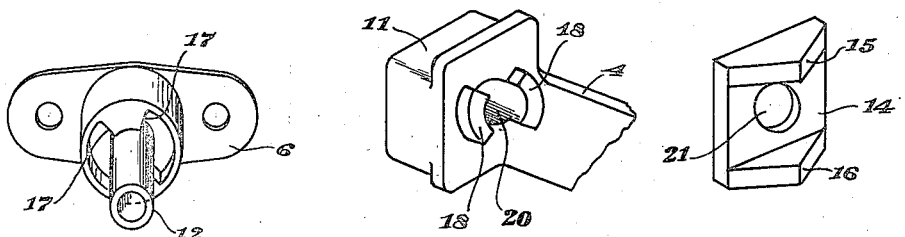
Fig. 5 shows the fulcrum casting.
Fig. 6 shows the fulcrum end of the operating lever.
Fig. 7 shows the washer.
Figure 8:
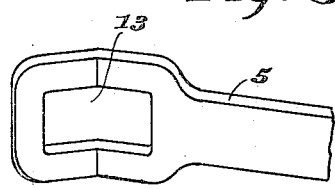
Fig. 8 shows the fulcrum end of the pin lifting lever.

The operating lever 4 has an enlarged rectangular extension, as shown at 11, which is pierced by a round perforation 20 which fits over the journal 12 of fulcrum 6. The exterior of this extending portion is rectangular and is just a trifle smaller than the rectangular aperture 13 in the pin lifting lever 5 so that a downward force on the operating lever transmits an upward movement to the pin lifting lever. The washer 14 has a round hole 21 fitting over journal 12 and is applied after the pin lifting lever is in position on the extension of the operating lever and performs two functions: first, it retains the pin lifting lever on the operating lever, and secondly, it acts as a fulcrum for the movement of the pin lifting lever caused by the in and out motion of the coupler. As shown in Fig. 7, this washer 14 has inwardly projecting lugs 15 and 16 and the fulcrum end of the pin lifting lever is deflected, the point of deflection being on the same plane as the points on lugs 15 and 16 so that the deflected portion of the pin lifting lever is caused to fulcrum between the points of the lugs and portions of the operating arm 4, indicated as 19.

The fulcrum end of the pin lifting lever is positioned between the two lugs 15 and 16 and the portion of the operating lever so that it is held in a substantially vertical plane, or in other words, is prevented from tipping, which would cause friction between the enlarged head of the operating lever and the pin lifting lever, and result in a wabbling and unsatisfactory movement.

Figure 1:
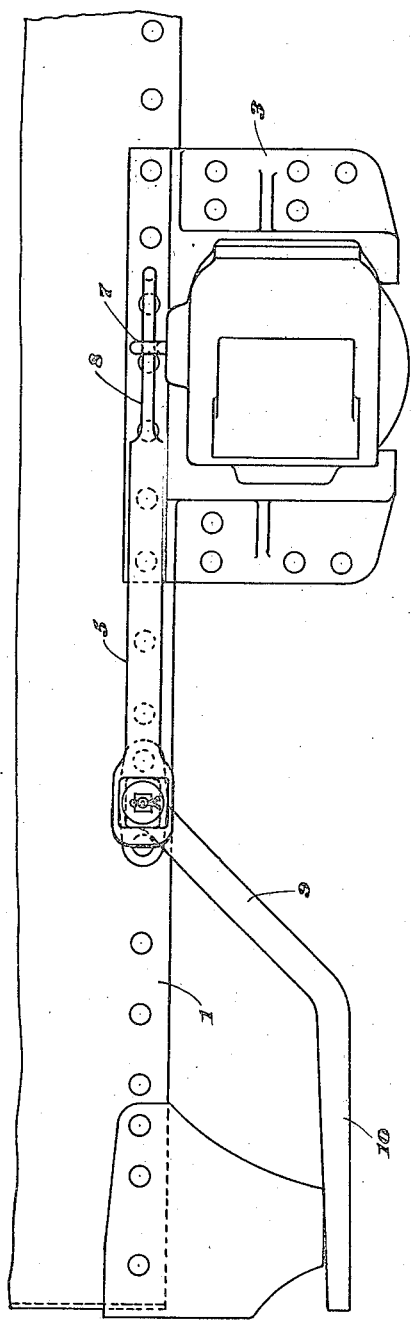
Fig. 1 shows an elevation of the device applied to a freight car.
Figure 2:
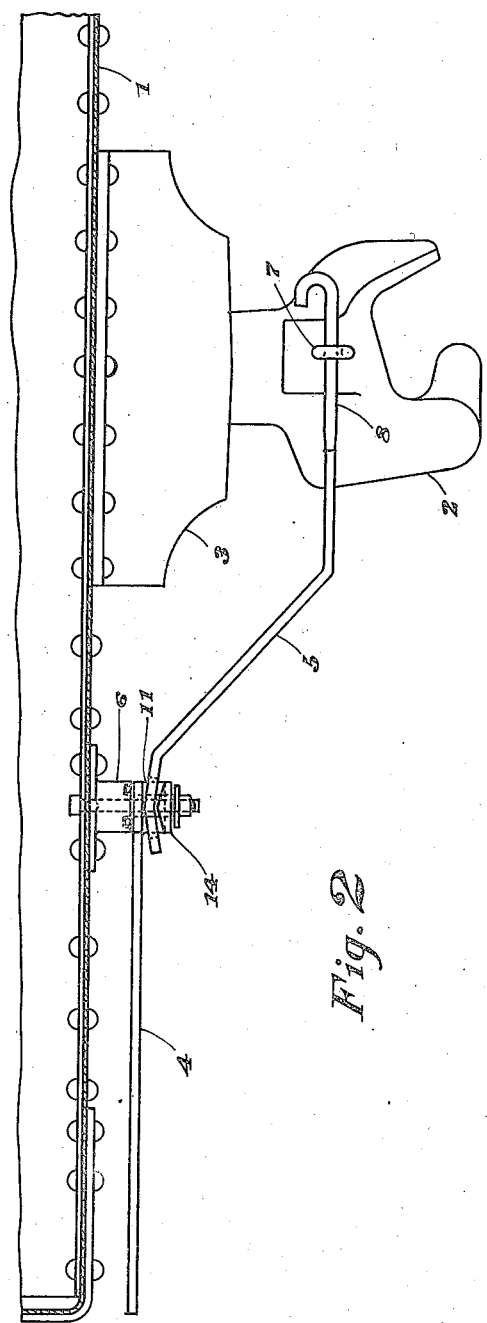
Fig. 2 shows a plan view of Fig. 1.
Figure 3:
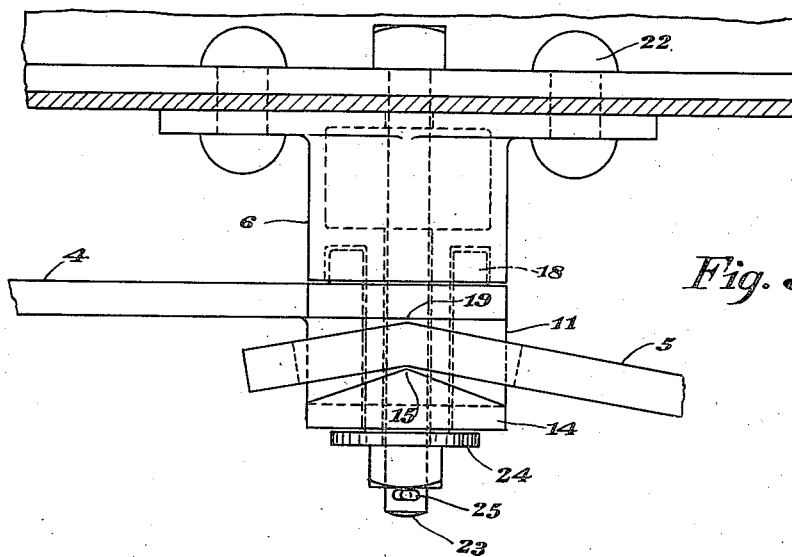
Fig. 3 shows an enlarged plan view of the fulcrum and portions of the two levers in the construction shown in Figs. 1 and 2.
Figure 4:
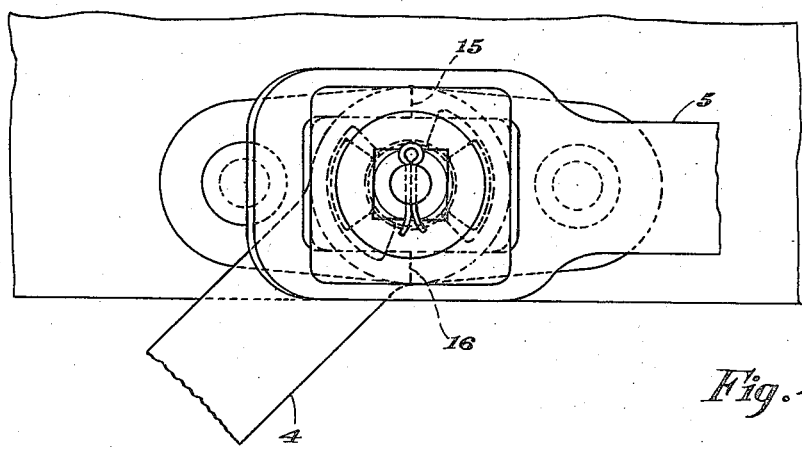
Fig. 4 shows an elevation of Fig. 3.

The fulcrum end of the operating lever is also provided with a projection or projections 18 which extend toward the car and which engage lugs or projections 17 on the fulcrum 6 so as to limit the upward or downward movement of the operating lever. The amount of this movement is predetermined. These stops 17 are shown in Figs. 3 and 5 and the stops 18 on the operating lever are shown in Figs. 3 and 6.

The fulcrum 6 is secured to the car by fasteners 22 and the operating lever, pin lifting lever and washer are held in proper operative position by bolt 23 and washer 24 provided with cotter pin 25 for security.

The fulcrum end of pin lifting lever 37 has a retangular perforation 45 which fits over the rectangular extension on operating lever 30, thus transmitting a vertical movement from the operating lever to the pin lifting lever. The lateral extension 31 has indentations 32 which engage lugs 33 to limit the vertical movement of operating lever 30 to a predetermined amount.

The fulcrum end of pin lifting lever 37 is slightly enlarged so that it will be wider at point 38 which is near a vertical plane passing through the fulcrum bolt 40. The fulcrum 36 has its end portion beveled in vertical plane, as shown at 39, so that point 41 is opposite point 38 on lever 37 when the device is assembled. By this construction and arrangement the coupler end of the pin lifting lever can move in and out with the coupler in draft without transmitting such movement to the operating lever 30. Furthermore, the proximity of points 38 and 42 to points 41 and 43 respectively retain the pin lifting lever in a vertical plane or prevent it from tipping.

The fulcrum 36 is attached to the car in any convenient manner such as flanges 46 and rivets 47. The various parts are held in proper operative position by bolts 40, washer 48 and nut 49. Cotter pin is provided for security.

Figs. 14 to 19 inclusive show a modification wherein the operating lever 50 has a lateral rectangular extension 51 which has round perforation 52 to accommodate journal 53 of fulcrum 54. The fulcrum end of pin lifting lever 55 has a rectangular perforation 56 which fits over the rectangular extension on operating lever 50, thus transmitting vertical movement from the operating lever to the pin lifting lever.

The fulcrum casting 54 is provided with vertical wall 57 which has upper and lower horizontal walls 58 which are tapered on their sides adjacent the operating lever, so as to form points 62 between which the rectangular extension of the operating lever is positioned. The outer ends of these horizontal walls form stops at points 63, 64, 65 and 66 to limit the vertical movement of the operating lever.

The horizontal walls are also tapered in a vertical plane to form projections at 58. The fulcrum end of pin lifting lever 55 is deflected and rebent, as shown in Fig. 14, so that the coupler end of the pin lifting lever can move in and out with the coupler in draft without transmitting such movement to the operating lever. Furthermore, the proximity of points 59 and 60 to points 58 and 61 respectively retain the pin lifting lever in a vertical plane or prevent it from tipping. The fulcrum end of the operating lever is slightly larger than the lateral extension thereon, as shown at 61, to provide abutments for lever 55.

The fulcrum 54 is attached to the car in any convenient manner such as flanges 67 and rivet 68. The various parts are held in proper operative position by bolt 69, nut 70 and washer 71.

While I have shown and described the rectangular lateral extension as being a part of the operating lever it is understood that same may be formed on the pin lifting lever and still come within the scope of the invention.

What I claim is:

1. An uncoupling device for car couplers comprising a fulcrum having a journal, an operating lever formed with a rectangular extension perforated for said journal, and a pin lifting lever having a rectangular perforation to engage said rectangular extension.

2. An uncoupling device for car couplers comprising a fulcrum having a journal, an operating lever, and a pin lifting lever; one of said levers formed with a rectangular extension perforated for said journal, and the other of said levers having a rectangular perforation to engage the said rectangular extension.

3. An uncoupling device for car couplers comprising a fulcrum having a journal, an operating lever, and a pin lifting lever; one of said levers formed with a rectangular extension perforated for said journal, and the other of said levers having a rectangular perforation to engage the said rectangular extension, and means within the perimeter of said extension to engage projections on said fulcrum whereby the vertical movement of said levers is restricted.

4. An uncoupling device for car couplers comprising a fulcrum having a journal, an operating lever formed with a lateral extension perforated for said journal, and a pin lifting lever perforated so as to non-rotatively engage said lateral extension.

5. An uncoupling device for car couplers comprising a fulcrum having a journal, an operating lever, and a pin lifting lever, one of said levers formed with a lateral extension perforated for said journal, and the other of said levers perforated so as to non-rotatively engage said lateral extension.

6. An uncoupling device for car couplers comprising a fulcrum having a journal, an operating lever formed with a lateral extension perforated for said journal, and a pin lifting lever perforated so as to non-rotatively engage said lateral extension, said operating lever formed with another lateral extension which projects in the opposite direction from the first mentioned extension which engages a stop on said fulcrum whereby the vertical movement of said lever is restricted.

7. An uncoupling device for car couplers comprising a fulcrum having a journal and a pair of horizontally disposed walls positioned respectively above and below said journal, an operating lever formed with a lateral extension perforated for said journal and mounted on said journal between said walls whereby the vertical movement of said lever is restricted, and a pin lifting lever operatively mounted on said extension.

GARTH G. GILPIN.